(12) United States Patent
Hoffmann et al.

(10) Patent No.: US 7,567,005 B2
(45) Date of Patent: Jul. 28, 2009

(54) LONG STATOR MOTOR

(75) Inventors: Reinhard Hoffmann, Nürnberg (DE);
Jörg Lehmpfuhl, Erlangen (DE);
Rüdiger Polley, Erlangen (DE); Robert Schmid, Neunkirchen am Brand (DE);
Wolfgang Spaeth, Zirndorf (DE);
Falk-Henner Wagner, Röttenbach (DE);
Günter Wagner, Ebermannstadt (DE);
Benno Weis, Hemhofen (DE)

(73) Assignee: Siemens Aktiengesellschaft, Munich (DE)

( * ) Notice: Subject to any disclaimer, the term of this patent is extended or adjusted under 35 U.S.C. 154(b) by 369 days.

(21) Appl. No.: 10/542,644

(22) PCT Filed: Dec. 10, 2003

(86) PCT No.: PCT/EP03/14007

§ 371 (c)(1),
(2), (4) Date: Feb. 8, 2006

(87) PCT Pub. No.: WO2004/065160

PCT Pub. Date: Aug. 5, 2004

(65) Prior Publication Data

US 2006/0145543 A1  Jul. 6, 2006

(30) Foreign Application Priority Data

Jan. 20, 2003  (DE)  ................. 103 01 945

(51) Int. Cl.
*H02K 1/00*  (2006.01)

(52) U.S. Cl. .................... 310/180; 310/12; 310/179
(58) Field of Classification Search .................. 310/12, 310/179–184; 104/281, 286
See application file for complete search history.

(56) References Cited

U.S. PATENT DOCUMENTS

| 3,594,622 | A | * | 7/1971 | Inagaki ........................ 318/687 |
| 3,884,154 | A |   | 5/1975 | Fritz |
| 4,314,168 | A | * | 2/1982 | Breitenbach ................... 310/13 |
| 4,665,329 | A | * | 5/1987 | Raschbichler ................. 310/13 |
| 4,728,382 | A | * | 3/1988 | Raschbichler ................ 156/264 |
| 5,483,111 | A | * | 1/1996 | Kuznetsov ...................... 310/12 |
| 5,889,340 | A | * | 3/1999 | Miller et al. ................... 310/12 |
| 6,570,290 | B2 | * | 5/2003 | Kazmierczak ............... 310/184 |
| 6,753,666 | B2 | * | 6/2004 | Fischperer .................... 318/135 |

FOREIGN PATENT DOCUMENTS

| DE | 24 26 968 | 1/1976 |
| DE | 31 10 339 | 9/1982 |
| DE | 38 24 662 | 1/1990 |
| DE | 43 15 939 | 11/1993 |
| DE | 101 17 333 | 10/2002 |
| EP | 0 300 126 | 1/1989 |

* cited by examiner

*Primary Examiner*—Thanh Lam
(74) *Attorney, Agent, or Firm*—Harness, Dickey & Pierce PLC

(57) ABSTRACT

A long stator motor, particularly for driving a magnetic levitation transport system, includes a stator iron, inside of which grooves for accommodating cable windings are provided. At least two cable windings are placed one above the other by running at least two cables inside each groove.

7 Claims, 1 Drawing Sheet

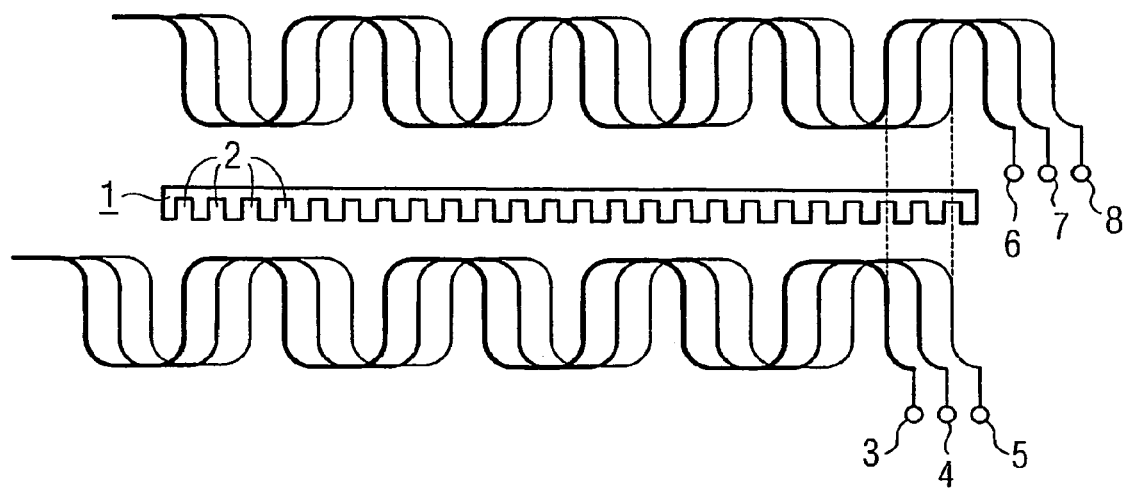

LONG STATOR MOTOR

This application is the national phase under 35 U.S.C. § 371 of PCT International Application No. PCT/EP2003/014007 which has an International filing date of Dec. 10, 2003, which designated the United States of America and which claims priority on German Patent Application number DE 103 01 945.6 filed Jan. 20, 2003, the entire contents of which are hereby incorporated herein by reference.

FIELD

The invention generally relates to a long stator motor. In particular, it relates to one for driving a magnetic levitation railroad, such as one having a stator iron in which slots are arranged for holding cable windings.

BACKGROUND

A long stator motor such as this, which is also referred to as a linear motor, generally has two or more stator coils. Each stator coil includes a stator iron in which slots are incorporated, and cable windings which run in these slots. In the case of a three-phase motor, the three cable windings for the three phases, and thus the slots which are required for this purpose as well, run offset with respect to one another.

Particularly during starting of a vehicle which is driven by a long stator motor, the magnetic flux to be achieved by the known apparatus in the stator iron is not sufficient in order to achieve the desired vehicle acceleration. This is mainly due to the fact that the cable windings cannot withstand the current level that is required for a sufficiently high magnetic flux. The current level cannot be increased since this would otherwise result in an excessively large thermal load on the stator coil.

On the other hand, the cable cross section cannot be enlarged in order to increase the possible current level since broader slots will make it impossible to arrange the slots for three cable windings, as are required for a three-phase motor. Furthermore, no more suitable materials are known for the stator iron which could allow a greater magnetic flux with the same current level.

SUMMARY

An embodiment of the invention includes an object of specifying a long stator motor which allows a considerably higher magnetic flux in the stator iron. This can thus allow, for example, greater acceleration of the driven vehicle. This may be of major importance, particularly in the starting phase.

According to an embodiment of the invention, an object may be achieved in that at least two cable windings may be arranged one above the other, and/or in that at least two cables run in each slot.

In particular, two cable windings may be arranged one above the other, and two cables run in each slot.

It has been found that the stator iron allows the slots to be made deeper without any problems. Two or more layers of cable windings, in particular two layers, an upper layer and a lower layer, can then be inserted one above the other into the slots. The cables of the cable windings in this case have the same cross sections as in the case of known solutions.

This results in the advantage that, even though the slots have the same width as in the past, and without any noticeable temperature increase in comparison to known solutions, it is possible to considerably increase the magnetic flux in the stator iron. This results in greater acceleration than with known long stator motors, which is particularly important during starting of a vehicle.

This is because higher vehicle acceleration values advantageously make it possible to shorten the intervals between trains.

The cables can be laid using standard laying methods.

By way of example, three cable windings are in each case arranged in one layer as a three-phase winding, and the layers formed in this way are arranged one above the other. This results in an advantageous geometric arrangement of the cable windings.

By way of example, the cables which run in one slot may be connected to the same phase of the three-phase windings. This results in a particularly uniform magnetic flux in the stator iron.

By way of example, the three-phase windings are connected in series. This results in the advantage that all the cable windings contribute optimally to the magnetic flux and an increased voltage is applied to the motor, thus making better use of a converter which feeds the motor.

According to another example, the three-phase windings are connected in parallel.

Two three-phase windings which are arranged one above the other are in each case offset, for example, through 180° with respect to one another. This results in the advantage that the crossing points of these windings are not positioned at the same point on the stator iron. This results in a shallower slot depth than otherwise. If only two windings are arranged one above the other, the slot does not need to be deeper than three cable cross sections.

The long stator motor according to an embodiment of the invention results in particular in the advantage that high acceleration values can be achieved for the driven vehicle, which in particular may be a transrapid, without the thermal load on the long stator motor becoming excessive. A magnetic flux which is sufficient for the desired acceleration is achieved in the stator iron without adversely affecting the robustness of the stator iron or necessitating a very large, heavy stator iron. The entire stator iron generally does not need to be any thicker than three cable cross sections.

BRIEF DESCRIPTION OF THE DRAWINGS

One example embodiment of a long stator motor according to the invention will be explained in more detail with reference to the drawing. The drawing shows, schematically, the arrangement of cable windings on a stator iron.

DETAILED DESCRIPTION OF THE EXAMPLE EMBODIMENTS

The stator iron 1, which is illustrated in the form of a section, has a sequence of slots 2. These slots 2 are used to hold cable windings 3 to 8. Until now, it has been normal for the slots 2 of a stator iron 1 to hold only three cable windings 3 to 5 of a three-phase system. These cable windings 3 to 5 each run through every third slot 2, so that the individual cable windings are distributed uniformly.

In the case of the long stator motor according to the example embodiment of the invention, three further cable windings 6 to 8 are laid in the same slots 2. The cable windings 3 to 5 which were mentioned first in this case form a first layer, while the further cable windings 6 to 8 form a second layer. The slots 2 need be no broader than in the known embodiment, but need only be deeper. This does not adversely affect the robustness of the stator iron 1. Broader slots 2 would not be feasible, for space reasons. The further cable windings 6 to 8 are laid relative to the first-mentioned cable windings 3 to 5 such that two cables come together in each individual slot 2 and are associated with the same phase of the respective three-phase winding or layer.

The two three-phase windings or layers, including on the one hand the first-mentioned three cable windings 3 to 5 and on the other hand the further three cable windings 6 to 8, are connected to one another either in series or in parallel. This circuitry measure is not illustrated in the drawing.

The long stator motor according to an embodiment of the invention does not require any broader slots 2, for which no space would be available anyway. Furthermore, this avoids thermal loading which would be unavoidable simply by increasing the current level. A magnetic flux can be produced easily and reliably which is sufficiently large to achieve greater acceleration of the driven vehicle, in particular during starting. This allows a higher train throughput rate.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A long stator motor, comprising:
   a stator iron in which slots are arranged for holding cable windings, with two cables running in one slot, wherein, in order to increase magnetic flux in the stator iron, at least two cable windings are arranged one above the other, and at least two cables run one above the other in each slot, wherein
   three cable windings are arranged in one layer as a three-phase winding, and the layers formed in this way are arranged one above the other, and
   two three-phase windings, arranged one above the other, are in each case offset through 180° with respect to one another.

2. The long stator motor as claimed in claim 1, wherein the cables which run in one slot are connected to the same phase of the three-phase windings.

3. A long stator motor, comprising:
   a stator iron, including grooves for accommodating cable windings, at least two cable windings being arranged one above the other by running at least two cables run inside each groove to thereby increase magnetic flux in the stator iron, wherein three cable windings are arranged in one layer as a three-phase winding, and wherein the layers formed in this way are arranged one above the other and wherein two three-phase windings, arranged one above the other, are in each case offset through 180° with respect to one another.

4. The long stator motor as claimed in claim 3, wherein the cables which run in one slot are connected to the same phase of the three-phase windings.

5. The long stator motor as claimed in claim 1, wherein the two cables are magnetic flux generating cables.

6. The long stator motor as claimed in claim 1, wherein the two cables are arranged in identical slots, one above the other.

7. The long stator motor as claimed in claim 1, wherein an uppermost layer consists of three cable windings.

* * * * *